United States Patent
Fontaine et al.

(10) Patent No.: US 11,621,901 B2
(45) Date of Patent: Apr. 4, 2023

(54) METHOD FOR MANAGING THE FREQUENCY OF MESSAGE TRANSMISSION ON A COMMUNICATION LINK

(71) Applicant: ORANGE, Issy-les-Moulineaux (FR)

(72) Inventors: Fabrice Fontaine, Chatillon (FR); Herve Marchand, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/292,855

(22) PCT Filed: Nov. 6, 2019

(86) PCT No.: PCT/FR2019/052625
§ 371 (c)(1),
(2) Date: May 11, 2021

(87) PCT Pub. No.: WO2020/099761
PCT Pub. Date: May 22, 2020

(65) Prior Publication Data
US 2021/0399963 A1   Dec. 23, 2021

(30) Foreign Application Priority Data

Nov. 12, 2018  (FR) ...................................... 1860433

(51) Int. Cl.
*H04L 43/0852*   (2022.01)
*H04L 43/103*   (2022.01)
(52) U.S. Cl.
CPC ........ *H04L 43/0852* (2013.01); *H04L 43/103* (2013.01)

(58) Field of Classification Search
CPC ... H04L 43/0852; H04L 43/103; H04L 45/02; H04W 4/22
USPC ........................................................ 709/224
See application file for complete search history.

(56) References Cited

U.S. PATENT DOCUMENTS

| | | | |
|---|---|---|---|
| 8,903,458 B1* | 12/2014 | Ho ................... | H04W 52/0261 455/574 |
| 2012/0303774 A1* | 11/2012 | Wilson ................. | H04L 51/214 709/223 |
| 2014/0233458 A1* | 8/2014 | Georgescu ............. | H04W 4/22 370/328 |

(Continued)

OTHER PUBLICATIONS

International Search Report dated Feb. 3, 2020 for corresponding International Application No. PCT/FR2019/052625, filed Nov. 6, 2019.

(Continued)

*Primary Examiner* — James E Springer
*Assistant Examiner* — Patrick F Ngankam
(74) *Attorney, Agent, or Firm* — David D. Brush; Westman, Champlin & Koehler, P.A.

(57) ABSTRACT

A method for managing message transmission times from a first device to a destination of a second device. The devices have respective electrical load levels at a given time. The method includes receiving a request to change message transmission times, the request including the current electrical load level associated with the second device; and determining transmission times by taking into account the load levels of the first and/or second device.

7 Claims, 2 Drawing Sheets

(56) References Cited

U.S. PATENT DOCUMENTS

2015/0245299 A1* 8/2015 Lee .................... H04W 68/00
370/311

OTHER PUBLICATIONS

Written Opinion of the International Searching Authority dated Feb. 3, 2020 for corresponding International Application No. PCT/FR2019/052625, filed Nov. 6, 2019.
English translation of the Written Opinion of the International Searching Authority dated May 11, 2021 for corresponding International Application No. PCT/FR2019/052625, filed Nov. 6, 2019.

* cited by examiner

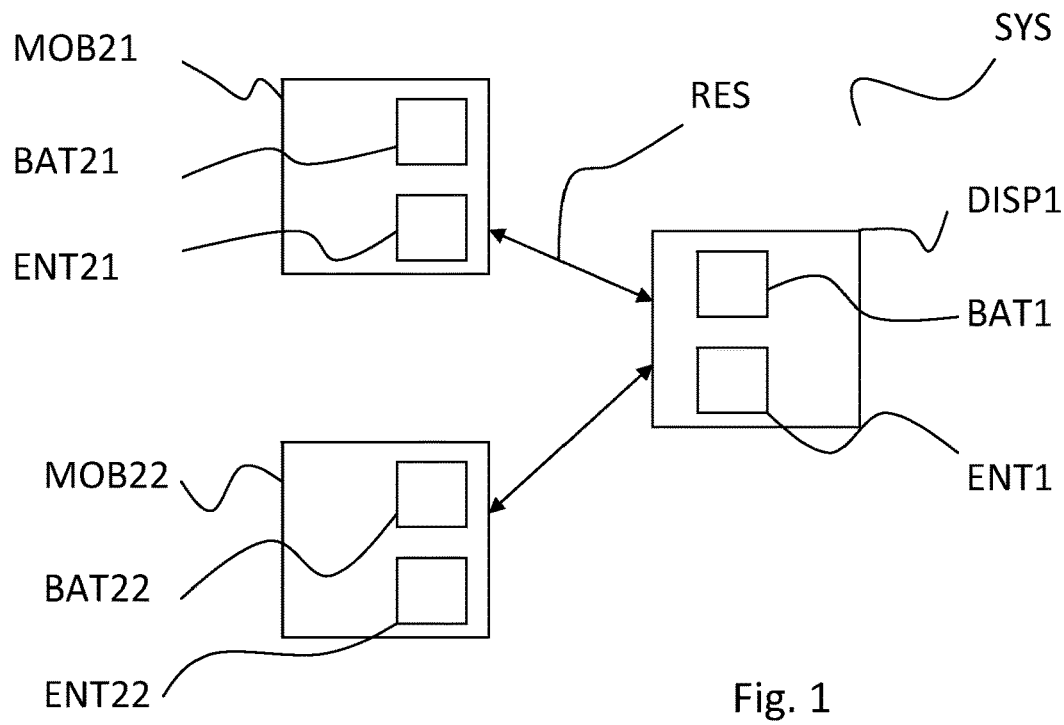
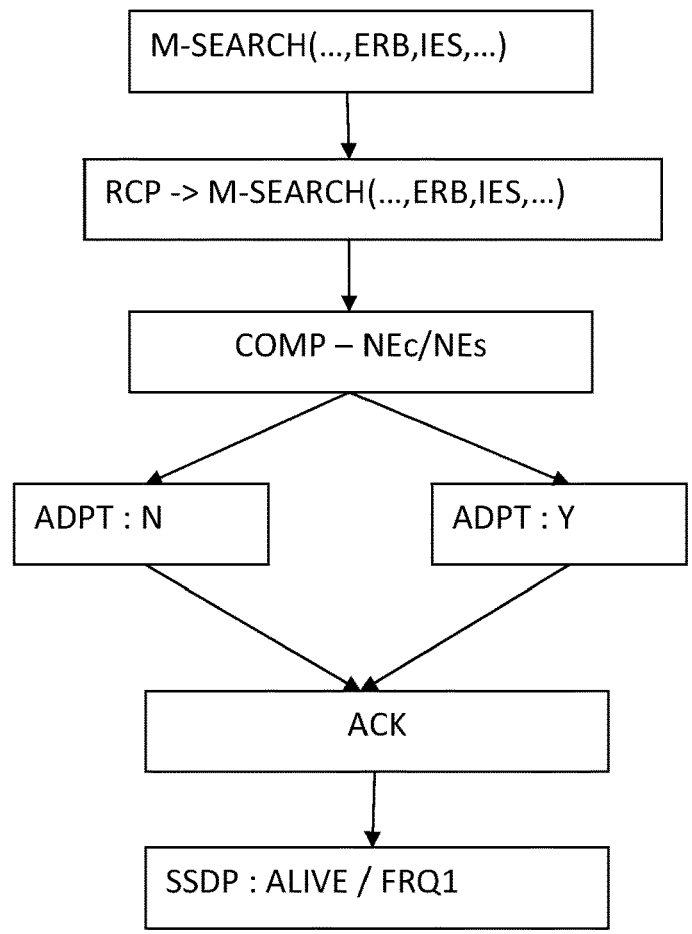
Fig. 1
Fig. 2

| DISP | ERB | IES | DEC |
|---|---|---|---|
| MOB21 | ERB21 | IES21 | ENT21 |
| MOB22 | ERB22 | IES22 | ENT22 |
| DISP1 | ERB1 | IES1 | ENT1 |

| DISP | ERB | IES | DEC |
|---|---|---|---|
| MOB21 | 10% | 60s | ENT21 :NO M-SEARCH |
| MOB22 | 50% | 90s | ENT22 : NO M-SEARCH |
| DISP1 | 100% | 1800s | ENT1 : Alive 60 s |

| DISP | ERB | IES | DEC |
|---|---|---|---|
| MOB21 | 80% | 60s | ENT21 : M-SEARCH -> 60s |
| MOB22 | 80% | 90s | ENT22 : M-SEARCH -> 90s |
| DISP1 | 40% | 1800s | ENT1 : Alive 1800 s |

| DISP | ERB | IES | DEC |
|---|---|---|---|
| MOB21 | 50% | 60s | ENT21 :M-SEARCH -> 60s |
| MOB22 | 10% | 90s | ENT22 : NO M-SEARCH |
| DISP1 | 100% | 1800s | ENT1 : Alive 90 s |

METHOD FOR MANAGING THE FREQUENCY OF MESSAGE TRANSMISSION ON A COMMUNICATION LINK

CROSS-REFERENCE TO RELATED APPLICATIONS

This Application is a Section 371 National Stage Application of International Application No. PCT/FR2019/052625, filed Nov. 6, 2019, which is incorporated by reference in its entirety and published as WO 2020/099761 A1 on May 22, 2020, not in English.

TECHNICAL FIELD

The invention relates to the field of telecommunications.

The invention relates to a method for managing the transmission times of messages, on a communication link, by a first device to a second device. The invention is very particularly applicable to a method for managing the transmission frequency of one and the same type of message on a communication link.

The invention is very particularly applicable to systems in which at least one device is supplied by an embedded energy source, such as a battery, a cell, etc.

The devices targeted above are of any type, specifically a smartphone, a digital tablet, a decoder, etc.

The invention is applicable to all systems in which the devices transmit one and the same type of message at precise times. The sending of messages at precise times targets messages that are transmitted periodically or non-periodically. For example, if communication is performed in accordance with the UPnP (abbreviation for "Universal Plug and Play") standard, a message of the abovementioned type may be the SSDP:ALIVE message that is transmitted every 1800 seconds by a device.

PRIOR ART

When a first and a second device contribute to performing a computing task, it is sometimes necessary to ascertain the current status of the connection between these two devices. Numerous communication protocols make it possible to obtain this connection status. For example, the UPnP protocol proposes, inter alia, two mechanisms for detecting the connection and the disconnection of UPnP equipment.

According to a first mechanism, the second device, called control point in the UPnP context, transmits M-SEARCH discovery requests in multicast mode when it is started up and then does so regularly. Following reception of this request, the first device responds in unicast mode to this control point. The reception of a response from a first device allows the second device to confirm a current connection status between the first and the second device. On the other hand, if the second device does not receive a response to an M-SEARCH request, the second device considers that the first device is disconnected.

One problem linked to using the first mechanism is that the control point is often an equipment that is supplied by a battery (for example a smartphone); increasing the sending frequency of the M-SEARCH requests may therefore result in extra energy consumption that is not desirable for this second device.

According to a second mechanism, the first device sends SSDP:Alive requests when it is started up and does so regularly in order to advertise its presence to other devices. These successive messages contain an item of data called "duration" (CACHE-CONTROL), described in the UPnP standard, indicating the duration of validity of the advertisement. The duration defined at present in the UPnP protocol is 1800 seconds by default. In other words, if, when this duration expires, the second device, called control point, does not receive an SSDP:Alive request, the second device then considers that the first device is disconnected. However, it is sometimes necessary to ascertain the connection status as quickly as possible.

Depending on the context, the duration of 1800 seconds may not be suitable. A control point may wish to ascertain the disconnection status more quickly without waiting for the period of 1800 seconds to expire. However, reducing this duration, for example to 900 seconds, may be detrimental to the first device if it is supplied by a battery; specifically, increasing the sending frequency would result in the battery being prematurely drained if the level of charge thereof were already low. The problem linked to using the second mechanism is that the control point does not know the state of charge of the first device; it also does not know whether the first equipment is connected to the mains, that is to say connected to an electricity grid, or supplied by a battery.

The invention aims to improve the situation.

The Invention

According to a first functional aspect, the invention relates to a method for managing the transmission times of messages from a first device to a second device, the devices having respective levels of electric charge at a given time, characterized in that it comprises a. a step of receiving a request to modify the transmission times of the messages, the request including the current level of electric charge associated with the second device (MOB21, MOB22);

b. a step of determining the transmission times by taking into account the levels of charge of the first and/or the second device.

The invention thus offers the option of appropriately deciding on the transmission times of the messages to the second device, so as to adapt to a particular context; modifying the transmission times is preceded by taking into account the levels of charge of the first and/or the second device.

Several possible cases will be seen below, in which the levels of charge of a single device or of the two devices are taken into account in order to determine whether or not the transmission times of the messages will be modified. One possible case in which a single level of charge is taken into account is the case for example in which the second device is charged for example to 100%; in this configuration, the first device does not modify the transmission times; on the understanding that the second device may modify its own operation, for example by itself increasing the transmission times of M-SEARCH messages. Another possible case is the one in which the two energy levels of the first and of the second device are taken into consideration; for example when the energy level of the second device is not at 100% and is lower than the energy level of the first one; in this case, in the example that will be described below, the times will be modified. The possible cases are of course not limited to those described above.

In definitive terms, the invention makes it possible to ascertain the connection status between two devices while at the same time ensuring good management of the levels of electric charge of the devices, in particular by avoiding burdening a device whose electric charge might be too low to perform the requested task.

According to a first particular mode of implementation of the invention, following the reception step, a comparison step is performed between the level of electric charge of the first device and the level of electric charge of the second device; the transmission times are then determined on the basis of the result of the comparison step. This first mode takes into account the level of charge of the first and the second device and makes it possible to decide whether or not to modify the transmission times of the messages transmitted by the first device to the second device.

According to a second particular mode of implementation of the invention, which may be implemented as an alternative or in addition to the previous one, the determination step comprises modifying the transmission times if the level of charge of the first device is greater than the level of charge of the second device. This second mode consists in modifying the transmission times, for example the sending frequency, of the first device only if the first device has a greater level of charge, on the understanding that the second device may opt for another solution if the times are not modified as requested. Another solution consists for example in increasing the sending frequency of messages transmitted by the second device, such as the M-SEARCH messages, as will be described below.

According to a third particular mode of implementation of the invention, which may be implemented as an alternative or in addition to the previous ones, the modification request targeted above furthermore includes desired sending times of the messages to the second device; in this configuration, in the determination step, the transmission times are set to the desired times. This third mode is advantageous since it is the second device that proposes transmission times, in particular a transmission frequency. This allows the first device to respond to a particular need desired by a second device.

According to a fourth particular mode of implementation of the invention, which may be implemented as an alternative or in addition to the previous ones, the reception step is followed by a comparison step between the current level of electric charge of the first device and a predefined electric charge value; next, the determination step takes place if the current level of charge is greater than the predefined level of charge. This feature is advantageous since the first device takes into account its own remaining energy level before deciding to implement the determination step. This feature has the advantage of avoiding the first device consuming energy when its remaining energy level is not sufficient.

According to a fifth particular mode of implementation of the invention, which may be implemented as an alternative or in addition to the previous ones, the determination step is followed by transmission, to the second device, of information in relation to the new set transmission times. This fifth mode is beneficial since, if the first device modifies or does not modify the sending frequency of the messages, the second device is informed thereof and is able to decide to implement a solution able to respond to its need in the second device.

According to a sixth particular mode of implementation of the invention, which may be implemented as an alternative or in addition to the previous ones, when several modification requests are received from several second devices, including electrical statuses associated with the second devices in question and desired durations, respectively, the determination step consists in selecting desired transmission times associated with the second device that has the lowest level of electric charge value. This feature is advantageous since the times that are chosen will be those that correspond to the second device that has the lowest energy level from among all of the received energy levels. The choice thereby does not affect the chosen second device, whereas another frequency requested by another second device would have been able to have the effect of consuming too much energy in the second device in question.

According to a seventh particular mode of implementation of the invention, which may be implemented as an alternative or in addition to the previous ones, if the level of charge of the second device, at the origin of the modification request, is greater than a threshold level of charge, the first device retains predefined transmission times. This seventh mode is beneficial since the first device does not take into account a modification request when it originates from a second device having an optimum level of charge, and may therefore be connected to an electricity grid and is therefore able itself to manage the transmission frequency of its own messages in order to ascertain the connection status between the first and the second device; for example the second device may increase the transmission frequency of the M-SEARCH messages, as will be explained below. In this configuration, the first device avoids consuming energy and therefore achieves a gain in terms of autonomy if it is supplied by a battery.

According to a first hardware aspect, the invention relates to an entity for managing the transmission times of messages from a first device to a second device, the devices having respective levels of electric charge at a given time, characterized in that it comprises a. a module for receiving a request to modify the transmission times of the messages, the request including the current level of electric charge associated with the second device;

b. a module for determining the transmission times by taking into account the levels of charge of the first and/or the second device.

According to a second hardware aspect, the invention relates to a device, called first device, characterized in that it comprises a management entity, called first management entity hereinafter, as defined above.

According to a third hardware aspect, the invention relates to a computer program product comprising program code instructions for implementing a management method defined above when it is executed by a processor.

According to a second functional aspect, the invention relates to a method for managing the transmission times of messages from a device, called second device, to a first device, the first and the second device being able to transmit successive messages at given times, respectively, the second device having a level of electric charge at a given time, characterized in that it comprises a. a step of transmitting a request to modify the transmission times of the messages by the first device, the request including a current level of electric charge associated with the second device;

b. a step of receiving information in relation to the new transmission times set by the first device;

c. a step of comparing the transmission times set by the first device with the current times used by the second device;

d. a step of adapting the transmission times of the messages transmitted by the second device on the basis of the comparison step.

According to a fourth hardware aspect, the invention relates to an entity for managing the transmission times of messages from the second device to the first device, the second device having a level of electric charge at a given time, characterized in that it comprises
- a. a module for transmitting a request to modify the transmission times of the messages, the request including the current level of electric charge associated with the second device;
- b. a module for receiving information in relation to the new transmission times set by the first device;
- c. a module for comparing the transmission times received from the first device with the current times used by the second device;
- d. a module for adapting the transmission times of the messages transmitted by the second device on the basis of the comparison step.

According to a fifth hardware aspect, the invention relates to a computer program product comprising program code instructions for implementing a management method, with reference to the second functional aspect, when it is executed by a processor.

According to yet another hardware aspect, the invention relates to a recording medium able to be read by a data processor and on which there is recorded a program comprising program code instructions for executing the steps of the method defined above.

Such a recording medium may be any entity or device capable of storing the program. For example, the medium may comprise a storage means, such as a ROM, for example a CD-ROM or a microelectronic circuit ROM, or else a magnetic recording means, for example a USB key or a hard disk.

The programs targeted above may be of any type. They may be downloaded from a communication network and/or recorded on a computer-readable medium.

The invention will be better understood upon reading the following description, given by way of example and made with reference to the appended drawings, in which:

FIG. 1 shows a computing system in which one exemplary embodiment of the invention is illustrated.

FIG. 2 is a timing diagram illustrating one embodiment of a first phase of the method of the invention. This first phase concerns a command for an item of content.

DETAILED DESCRIPTION OF EMBODIMENTS ILLUSTRATING THE INVENTION

Figures 3A, 3B, 3C, 3D, 4:
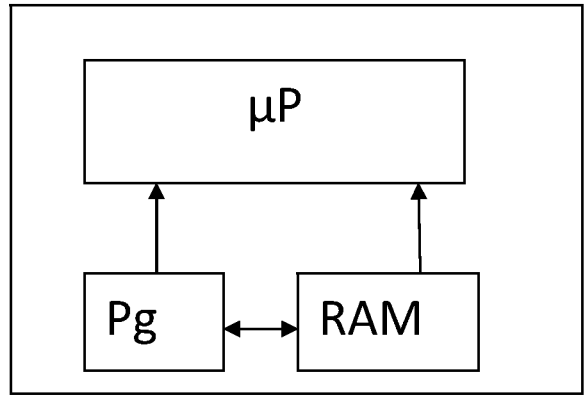
FIG. 3A shows a table including attributes present in a modification request and decisions made by the various entities present in the devices.
FIGS. 3B to 3D are tables including values of attributes and examples of decisions representative of the exemplary embodiment.
FIG. 4 shows a simplified overview of the structure of a first or a second device according to the present invention.

FIG. 1 shows a system SYS comprising a first device DISP1 and two second devices MOB21 and MOB22.

The first device DISP1 and a second device MOB21/MOB22 communicate with one another via a communication link RES. The devices are supplied with electrical energy by way of an electrical energy source. The energy source is of any type; it may originate from an electricity grid or be embedded in the devices, such as for example cells, batteries, etc.

The invention is applicable to all energy sources; the invention is however particularly beneficial when one or the other of the devices is supplied by way of an embedded electricity source, for example a battery, the energy of which decreases over time when the battery is not recharged. In our example, the devices are supplied with electrical energy by way of an electrical energy source BAT.

In our example, the first device DISP1 is a decoder and the second devices MOB21/MOB22 are two smartphones.

A management entity ENT1 installed in the first device DISP1 has the role of defining the sending time of the messages from the smartphone. It will be seen hereinafter that each control point MOBn also has an entity ENT2$n$ ($n$ is an integer) that will manage the sending frequency of the M-SEARCH messages on the basis of the decision made by the management entity ENT1. In our example, the system SYS comprises two entities ENT21 and ENT22 installed in the smartphones MOB21 and MOB22, respectively.

The second device, MOB21 or MOB22, and the first device DISP1 communicate directly with one another without an intermediary or via an intermediary, such as a home gateway.

If the two devices communicate via a home gateway, in a preliminary step (not shown), the first and the second device may also, rather than connecting directly to one another, first connect to the local area network, that is to say to the service gateway GTW of the local area network. Next, once the two equipments are connected to the network via the service gateway, they establish communication with one another via the gateway.

In our example, the protocol that is used between the second and the first device is the UPnP protocol. In this context, the second device performs the role of the control point. It will be recalled just that a control point is a controller that is capable of discovering and of controlling peripherals, such as the first device. A control point conventionally transmits messages, called discovery messages (M-SEARCH), to the various terminals of the network in order to recover in return a description of the devices corresponding to the request. These discovery messages are more often than not transmitted in point-to-multipoint communication mode, also called multicast mode, from the control point to the devices. A terminal equipment compatible with the UPnP standard, for example the first device, responds to these request messages and also transmits presence messages (SSDP:ALIVE) at a regular frequency in order to signify that it is active and connected to the network. The control point of the local area network, which is located in this case on the mobile device, transmits search messages (M-SEARCH) in multicast mode.

The sending frequency of the SSDP:ALIVE messages is set beforehand. The UPnP protocol imposes a sending frequency of 1800 seconds; if, after this duration, the control point has not received any new SSDP:Alive messages, then the control point may consider that the first device is disconnected.

In order to detect the disconnection of the remote UPnP device more quickly, the invention proposes to modify the sending times of the SSDP:ALIVE messages under certain conditions.

According to the invention, the steps executed by the management entity ENT1 are as follows:
- a. a step of receiving a request to modify the transmission times of the messages to the first device, the request including a current level of electric charge associated with the second device (MOB21, MOB22);
- b. a step of determining the transmission times by taking into account at least the level of charge of the second device.

Following the determination step, the transmission times may be modified or retained.

More precisely, according to one embodiment, following the reception step, the method comprises a step of comparing the level of electric charge of the first device and the level of electric charge of the second device; the transmission times are then determined on the basis of the result of the comparison step. For example, if the level of charge of the first device is greater than that of the second device, then, in this case, the first device may modify the transmission times, for example by increasing the frequency to a frequency value desired by the second device in the M-SEARCH message.

According to the invention, the messages transmitted by the second devices MOB21/MOB22, control points, include attributes that will be taken into account by the management entity ENT1 in order to decide on the sending times of messages, in particular of the SSDP:Alive messages. Following the taking into account, the management entity ENT1 executes an algorithm for dynamically adapting the sending frequency of the messages. In definitive terms, the entity ENT1 decides whether the frequency should be modified (reduced or increased) or kept at the same value.

FIG. 2 is a schematic view of the various steps of one embodiment of the method of the invention.

The steps are as follows; in order to simplify the disclosure, the steps will be described with reference to one control point, for example the smartphone MOB21. The other control point MOB22 performs the same steps as the first control point, the only difference being that the values of the attributes may be different.

In a first step ET1, the second device MOB21 transmits an M-SEARCH ( . . . ERB, IES, . . . ) message including several attributes, including the following:
- a first second ERB attribute in order to indicate to the first device the remaining energy in the battery of the second device MOB21, for example in the form of a percentage: 100%, 50%, 10%.
- a second IES attribute in order to indicate to the first device DISP1 the desired transmission times of the messages by the first device, for example every X seconds in order to indicate that the control point wishes to receive SSDP:Alive messages every X seconds.

In a second step ET2, the first device DISP1 receives RCP the M-SEARCH ( . . . , ERB, IES, . . . ) message originating from the second device and recovers the attributes, in particular the ERB attribute and the IES attribute.

Next, depending on the energy constraints received from the second device MOB21, specifically the remaining electrical energy level of the second device MOB21, and on the remaining electrical energy level of the first device DISP1, the first device decides to adapt ADPT or not to adapt the sending frequency of the SSDP:Alive messages to the second device.

In our exemplary embodiment, a threshold energy level NEs is defined beforehand.

In a third step ET3, the module ENT1 compares COMP the current energy level NEc of the first device DISP1 with the threshold energy level NEs.

If the current energy level NEc is lower than the threshold energy level NEs (step 4a), in our example, the first device does not adapt the sending frequency. In other words, the sending frequency is retained.

If the current energy level NEc is greater than the threshold energy level NEs (step 4b), in our example, the first device adapts the sending frequency by increasing the sending frequency with a frequency corresponding to the second IES attribute defined above.

Once the sending frequency has been set, the first device, in a fifth step ET5, transmits to the second device MOB21 an acknowledgement message ACK with the new duration set by the first device as parameter. This acknowledgement message allows the second device to adapt its own operation when it receives this acknowledgement message, without waiting to receive an SSDP:Alive message.

Such an acknowledgement message is of the following type:
HTTP/1.1 200 OK
CACHE-CONTROL: max-age=seconds until advertisement expires
DATE: when response was generated
EXT:
LOCATION: URL for UPnP description for root device
SERVER: OS/version UPnP/1.0 product/version
ST: search target
USN: advertisement UUID The parameter "max-age" indicates the new sending frequency of the SSDP:Alive messages.

Next, in a sixth step ET6, the first device transmits SSDP:Alive messages at the set frequency FRQ1.

Such an SSDP:Alive message may take the following form:
NOTIFY*HTTP/1.1
HOST: 239.255.255.250:1900
CACHE-CONTROL: max-age=seconds until advertisement expires
LOCATION: URL for UPnP description for root device
NT: search target
NTS: ssdp:alive
SERVER: OS/version UPnP/1.0 product/version
USN: advertisement UUID As indicated above, the invention is applicable to an indeterminate number of second devices MOB2n. If consideration is given to two second devices MOB21, MOB22 transmitting different M-SEARCH ( . . . , ERB, IES, . . . ) messages to the first device in the first step; in this case, if the received first ERB attributes are different, the first device DISP1 selects a first attribute from among the received first attributes, for example the one corresponding to the second device having the least remaining energy.

Optionally, following the setting of the new sending frequency FRQ of the SSDP:Alive messages by the first device DISP1, in our example, each control point MOB21/MOB22 will take into account this new value and proceed to adapt its own parameters for sending M-SEARCH messages, in particular the sending frequency of the M-SEARCH messages. If the system comprises two control points MOB21/MOB22, each point may modify the sending frequencies FRQ21/FRQ22 of the M-SEARCH messages, respectively.

More precisely, in step 4b, in our example, if the first device adapts the sending frequency by increasing the sending frequency with a frequency corresponding to the second IES attribute of a first control point MOB21, the second control point MOB22 may then, on the basis of the set frequency, adapt its transmission frequency of M-SEARCH messages. For example, if the frequency FRQ1 set by the first device is lower than the value of the IES attribute requested by the second device in question MOB22; in this case, the second device in question MOB22 may deactivate the sending of the M-SEARCH messages. On the other hand, if the set frequency is greater, the second device in question MOB22 may modify the sending frequency of the M-SEARCH messages to the requested IES attribute in the M-SEARCH message transmitted to the first device DISP1.

It should be noted that the sending times of the messages are managed by another management entity. Hereinafter, the management entity that manages the sending time of the SSDP:Alive messages is called first management entity ENT1; and the management entity that manages the sending time of the M-SEARCH messages is called second management entity ENT2n.

Some examples will be described below for implementing the algorithm described with reference to FIG. 2.

With reference to FIG. 3A, the examples are described with the aid of a table including several columns:
- a first column DISP comprising the devices in question MOB21, MOB22, DISP1
- a second column ERB comprising the ERB attributes of each device, respectively: ERB21, ERB22, ERB1
- a third column IES comprising the IES attributes of each device, respectively: IES21, IES22, IES1
- a fourth column DEC relating to the decision made by the management entity ENT21, ENT22, ENT1 of the device in question MOB21, MOB22, DISP1, respectively.

Several examples will be described with reference to FIGS. 3B to 3D, with values of ERB and IES attributes associated with each device involved. In this example, it is assumed that the computing system SYS comprises two control points that are illustrated by way of two mobile devices MOB21 and MOB22. The table also indicates the decision made by each of the devices, in the last column.

In all of these exemplary embodiments, a threshold energy level NEs=50% is defined beforehand.

A first example is illustrated in FIG. 3B, showing the table described in FIG. 3A filled in with values of attributes and decisions made by the entities.

In this first example, the first device is charged to 100%; this first device is for example a decoder connected to the mains.

The first device receives the M-SEARCH ( . . . , ERB, IES, . . . ) message originating from the second device and recovers the ERB and IES attributes of each second device MOB21, MOB22: For the second device MOB21
ERB=10%, meaning that the battery of the second device MOB21 has 10% remaining energy;
IES=60 s, meaning that the second device wishes to receive SSDP:Alive messages every 60 s rather than 1800 s.
For the second device MOB22
ERB=50%, meaning that the battery of the second device MOB21 has 50% remaining energy;
IES=90 s, meaning that the second device wishes to receive the SSDP:Alive messages every 90 s rather than 1800 s.

The module ENT1 compares the current energy level NEc of the first device DISP1 with the threshold energy level NEs of the second device in question. The level NEc is 100%, and therefore greater than the level NEs of 50%.

In this case, the first device DISP1 adapts the sending frequency by increasing the sending frequency with a frequency corresponding to the first attribute defined above.

Since several second devices MOB21, MOB22 are involved, the first device selects a first attribute from among the received first attributes, for example the one corresponding to the second device that has the least remaining energy, that is to say 60 s.

Once the sending frequency has been set, the first device transmits, to the second device MOB21, an acknowledgement message of the type described above.

Next, the first device transmits SSDP:Alive messages at the set frequency of 60 s.

In addition, depending on the frequency set by the first device DISP1, the second devices MOB21 and MOB22 decide or do not decide to transmit an M-SEARCH message or to adapt the sending frequency of this message. In the present case, the duration set by the first device is less than or equal to the received IES attribute values. In this case, the control points deactivate the sending of the M-SEARCH messages, respectively.

A second example is illustrated in FIG. 3C, showing the table described in FIG. 3A filled in with values of attributes and decisions made by the entities.

In this second example, the first device is charged to 40%. This first device could be a mobile telephone equipped with a battery.

The first device DISP1 receives the M-SEARCH ( . . . , ERB, IES, . . . ) message originating from the second device and recovers the ERB and IES attributes in relation to each device MOB21 and MOB22:
For the second device MOB21
ERB=80%, meaning that the battery of the second device MOB21 has 80% remaining energy;
IES=90 s, meaning that the second device wishes to receive the SSDP:Alive messages every 90 s rather than 1800 s.
For the second device MOB22
ERB=50%, meaning that the battery of the second device MOB21 has 50% remaining energy;
IES=1800 s, meaning that the second device wishes to receive the SSDP:Alive messages every 1800 s.

Next, depending on the energy constraints received from the second device MOB21, specifically the remaining electrical energy level of the second device, and on the remaining electrical energy level of the first device, the first device decides to adapt or not to adapt the sending frequency of the SSDP:Alive messages to the second device. In this case, the module ENT1 compares the current energy level NEc of the first device DISP1 with the threshold energy level NEs.

In this second example, the current energy level NEc (40%) is lower than the threshold energy level NEs (50%). In our example, the first device does not adapt the sending frequency. In other words, the sending frequency of 1800 s is retained.

Once the sending frequency has been set, the first device transmits, to the second device MOB21, an acknowledgement message and then transmits SSDP:Alive messages at the set frequency of 1800 s.

Optionally, once the new duration has been set, the control points will proceed to adapt the sending frequency of the M-SEARCH messages. The sending duration of the SSDP: Alive messages (1800 s) is greater than the requested durations, specifically 60 s and 90 s. In this case, the second devices decide to modify the sending frequency of the M-SEARCH messages to 60 s and 90 s, respectively, specifically in order to meet their need.

A third example is illustrated in FIG. 3D, showing the table described in FIG. 3A filled in with values of attributes and decisions made by the entities.

In this third example, the first device is again charged to 100%, just as in the first example.

The first device receives the M-SEARCH ( . . . , ERB, IES, . . . ) message originating from the second device and recovers the ERB and IES attributes in relation to each device MOB21 and MOB22:

For the second device MOB21
ERB=50%, meaning that the battery of the second device MOB21 has 50% remaining energy;
IES=60 s, meaning that the second device wishes to receive the SSDP:Alive messages every 60 s rather than 1800 s.
For the second device MOB22
ERB=10%, meaning that the battery of the second device MOB21 has 100% remaining energy;
IES=90 s, meaning that the second device wishes to receive the SSDP:Alive messages every 90 s.

Next, depending on the energy constraints received from the second device MOB21, specifically the remaining electrical energy level of the second device, and on the remaining electrical energy level of the first device, the first device decides to adapt or not to adapt the sending frequency of the SSDP:Alive messages to the second device. In this case, the module ENT1 compares the current energy level NEc of the first device DISP1 with the threshold energy level NEs.

In this third example, the current energy level NEc (100%) is greater than the threshold energy level NEs (50%). In our example, the first device will therefore adapt the sending frequency by setting it to 90 s.

Optionally, once the new duration has been set by the first device DISP1, the control points, depending on the set duration, will accordingly adapt or not adapt the sending frequency of the M-SEARCH messages.

In our example, the frequency used by the second device MOB21 is 60 s; this frequency is lower than the set duration of 90 s. As a result, the second device modifies its sending frequency of the M-SEARCH messages to 60 s.

In our example, the frequency used by the second device MOB21 is 90 s. Unlike the second device MOB21, the second device MOB22 does not modify the sending frequency of the M-SEARCH messages, since the frequency that it uses is equal to the frequency set by the first device DISP1.

The control points may also be supplied other than by a battery; they may be supplied by an electricity grid. In this case, assuming that the first device is supplied with a battery, the first module ENT1 asks the control points to modify their own sending frequency of the M-SEARCH messages so as not to consume the energy of the first device; the first device may in this case maintain the sending frequency of the SSDP:Alive messages or even reduce the sending frequency.

It should be noted that the sending times of the messages are managed by another management entity. Hereinafter, the management entity that manages the sending time of the SSDP:Alive messages is called first management entity ENT1; and the management entity that manages the sending time of the M-SEARCH messages is called second management entity ENT2$n$.

Also, when a second device MOB21/MOB22 is connected to the mains, the ERB attribute is set to 100% without it being necessary to perform a calculation. The attribute may then have a value of 100% or any other information that will be understood by the first device to mean a device supplied by the mains.

As a variant, rather than using an ERB attribute in the M-SEARCH message, the first device, with or without using the home gateway described above, might attempt to use other means to determine the energy class of the device in question and its battery level. In particular, it would be possible to detect devices connected to the mains in order to assign them an energy of 100%.

By way of example, the detection of a device connected to the mains may consist in recovering the DHCP name or the DNS name and using these names to determine whether the device in question is for example a smartphone, which is therefore probably battery-operated, or a fixed computer, which is therefore connected to the mains.

The detection of a device connected to the mains may also consist in determining a type of connection used by a device: Ethernet, Wi-Fi, etc. If the connection is an Ethernet connection, this probably means that the device in question is a computer connected to the mains.

The detection of a device connected to the mains may also consist in determining the duration for which the device has been connected to the network. For example, if the connection has not been broken for several days, this means that the device is probably supplied by the mains.

Lastly, the detection of a device connected to the mains may also consist in calculating the trend of the strength of the signal originating from the device. If the strength is virtually constant, it may be concluded that the device is not moving and is therefore probably a PC, a decoder, etc. connected in Wi-Fi mode and supplied by the mains.

In our example, the management entities are installed in the devices in question, but may very well be located outside of the devices, for example on a server able to communicate with a device.

It should be stated here that the devices MOB21/MOB22/DISP1 all have the hardware architecture of a conventional computer. They in particular have a processor PRO, a random access memory RAM and a read-only memory in which a computer program Pg according to the invention is recorded. The first device comprises a program Pg containing instructions for executing the steps of the method whose flowchart is given in FIG. 2.

In our example, the program stored in the first device DISP1 is the entity ENT1; the program stored in the second devices MOB21/MOB22 are entities ENT21/ENT22, respectively.

It should be stated here that the term module or entity may correspond equally well to a software component, a computer program, as to a hardware component or a set of hardware and software components, a software component itself corresponding to one or more computer programs or subroutines or, more generally, to any element of a program able to implement a function or a set of functions as described for the modules in question. In the same way, a hardware component corresponds to any element of a hardware assembly able to implement a function or a set of functions for the module in question (integrated circuit, chip card, memory card, etc.).

Lastly, in order to implement the invention, the first management entity ENT1 comprises
a. a module for receiving a request to modify the transmission times of the messages, the request including the current level of electric charge associated with the second device MOB21, MOB22;
b. a module for determining the transmission times by taking into account the levels of charge of the first and/or the second device.

In order to implement the invention, a second management entity ENT21/ENT22 comprises
a. a module for transmitting a request to modify the transmission times of the messages, the request including the current level of electric charge associated with the second device;

b. a module for receiving information in relation to the new transmission times set by the first device;

c. a module for comparing the transmission times received from the first device with the current times used by the second device;

d. a module for adapting the transmission times of the messages transmitted by the second device on the basis of the comparison step.

The examples have been described with several second devices; the principle of the invention is however applicable to an indeterminate number of second devices.

The invention claimed is:

1. A method for managing device transmission times of messages, a first device emitting messages with first transmission times, and receiving messages from a second device with second transmission times, the first and second devices having respective levels of electric charge at a given time, wherein the method is implemented by the first device and comprises:

receiving a request to modify at least one of the transmission times of the messages, the request including the current level of electric charge associated with the second device;

comparing the level of electric charge of the first device and the level of electric charge of the second device; and modifying the transmission times of at least one of the first device or the second device based on a result of the comparing the levels of electric charge of the first device and the second device.

2. The management method as claimed in claim 1, wherein the request furthermore includes desired sending times of the messages to the second device, and wherein, in the modifying, the transmission times are set to the desired sending times.

3. The management method as claimed in claim 1 wherein the receiving is followed by comparing the current level of electric charge of the first device with a predefined charge value, and wherein the modifying takes place if the current level of charge is greater than the predefined charge value.

4. The management method as claimed in claim 1, wherein the modifying is followed by transmission, to the second device, of information in relation to the modified transmission times.

5. The method as claimed in claim 3, further comprising, when several modification requests are received from several second devices, including electrical statuses associated with the several second devices and desired durations, respectively, selecting desired transmission times associated with the second device that has the lowest level of electric charge value.

6. A first device for managing transmission times of messages, said first device emitting messages with first transmission times, and receiving messages from a second device with second transmission times, the first and second devices having respective levels of electric charge at a given time, wherein the first device comprises:

a processor; and a non-transitory computer-readable medium comprising instructions stored thereon which when executed by the processor configure the first device to:

receive a request to modify at least one of the transmission times of the messages, the request including the current level of electric charge associated with the second device;

compare the level of electric charge of the first device and the level of electric charge of the second device; and modifying the transmission times of at least one of the first device or the second device based on a result of the comparing the levels of electric charge of the first device and the second device.

7. A non-transitory computer-readable medium comprising a computer program product stored thereon comprising program code instructions for implementing a management method transmission times of messages, when the instructions are executed by a processor of the first device, said first device emitting messages with first transmission times, and receiving messages from a second device with second transmission times, wherein the first and second devices have respective levels of electric charge at a given time, and wherein the instructions configure the first device to:

receive a request to modify at least one of the transmission times of the messages, the request including the current level of electric charge associated with the second device;

compare the level of electric charge of the first device and the level of electric charge of the second device; and modify the transmission times of at least one of the first device or the second device based on a result of the comparing the levels of electric charge of the first device and the second device.

* * * * *